US011453373B2

(12) United States Patent
Takeya

(10) Patent No.: US 11,453,373 B2
(45) Date of Patent: Sep. 27, 2022

(54) BRAKE CONTROL DEVICE FOR VEHICLE

(71) Applicant: ADVICS CO., LTD., Kariya (JP)

(72) Inventor: Yusuke Takeya, Miyoshi (JP)

(73) Assignee: ADVICS CO., LTD., Kariya (JP)

( * ) Notice: Subject to any disclaimer, the term of this patent is extended or adjusted under 35 U.S.C. 154(b) by 370 days.

(21) Appl. No.: 16/650,952

(22) PCT Filed: Sep. 28, 2018

(86) PCT No.: PCT/JP2018/036295
§ 371 (c)(1),
(2) Date: Mar. 26, 2020

(87) PCT Pub. No.: WO2019/065982
PCT Pub. Date: Apr. 4, 2019

(65) Prior Publication Data
US 2020/0254990 A1    Aug. 13, 2020

(30) Foreign Application Priority Data
Sep. 28, 2017  (JP) ............................. JP2017-187388

(51) Int. Cl.
*B60T 13/68* (2006.01)
*B60T 13/16* (2006.01)
(Continued)

(52) U.S. Cl.
CPC .......... *B60T 13/686* (2013.01); *B60T 13/167* (2013.01); *F15B 7/06* (2013.01); *F15B 21/008* (2013.01)

(58) Field of Classification Search
CPC ..................... B60T 13/686; F15B 21/008
See application file for complete search history.

(56) References Cited

U.S. PATENT DOCUMENTS 6,662,824 B2 * 12/2003  Inage .................... F16K 15/042
                                                          137/539.5
7,530,649 B2 *  5/2009  Kusano .................... B60T 11/20
                                                          303/114.1
(Continued)

FOREIGN PATENT DOCUMENTS

CN      103661330 A       3/2014
JP      2002195429 A      7/2002
JP      2008137603 A      6/2008

OTHER PUBLICATIONS

International Search Report (PCT/ISA/210) dated Dec. 25, 2018, by the Japan Patent Office as the International Searching Authority for International Application No. PCT/JP2018/036295.
(Continued)

*Primary Examiner* — Thomas E Lazo
(74) *Attorney, Agent, or Firm* — Buchanan Ingersoll & Rooney PC

(57) ABSTRACT

A brake control device adjusts a fluid pressure of a brake fluid in a wheel cylinder, and is provided with: a fluid passage which connects a master cylinder and the wheel cylinder; a first electromagnetic valve which is provided in the fluid passage; a second electromagnetic valve which is provided in the fluid passage between the first electromagnetic valve and the wheel cylinder; a fluid pump which is driven by an electric motor, suctions the brake fluid from the fluid passage at a suction part between the first electromagnetic valve and the second electromagnetic valve, and discharges the brake fluid to the fluid passage at a discharge part between the first electromagnetic valve UP and the second electromagnetic valve; a check valve which is provided between the fluid pump and the discharge part; and a controller which controls the first electromagnetic valve, the second electromagnetic valve, and the electric motor.

2 Claims, 3 Drawing Sheets

(51) Int. Cl.
*F15B 7/06* (2006.01)
*F15B 21/00* (2006.01)

(56) References Cited

U.S. PATENT DOCUMENTS

| | | | | |
|---|---|---|---|---|
| 7,938,493 | B2* | 5/2011 | Miyazaki | B60T 8/442 |
| | | | | 303/11 |
| 8,167,381 | B2* | 5/2012 | Nakamura | B60T 8/261 |
| | | | | 188/344 |
| 9,896,074 | B2* | 2/2018 | Endo | B60T 1/10 |
| 2002/0079000 | A1 | 6/2002 | Inage et al. | |
| 2006/0181143 | A1* | 8/2006 | Yamamoto | B60T 8/368 |
| | | | | 303/87 |
| 2008/0236959 | A1* | 10/2008 | Hashida | B60T 8/4077 |
| | | | | 188/72.2 |
| 2008/0238186 | A1* | 10/2008 | Suzuki | B60T 13/686 |
| | | | | 303/20 |
| 2013/0257140 | A1* | 10/2013 | Ogiwara | B60T 1/10 |
| | | | | 303/3 |
| 2014/0084673 | A1 | 3/2014 | Matsuoka | |
| 2016/0152221 | A1* | 6/2016 | Furuyama | B60T 11/28 |
| | | | | 303/11 |

OTHER PUBLICATIONS

Written Opinion (PCT/ISA/237) dated Dec. 25, 2018, by the Japan Patent Office as the International Searching Authority for International Application No. PCT/JP2018/036295.

\* cited by examiner

BRAKE CONTROL DEVICE FOR VEHICLE

TECHNICAL FIELD

The present invention relates to a brake control device for a vehicle.

BACKGROUND ART

Patent Literature 1 describes, for the purpose of "preventing or suppressing amplification of pressure pulsation by vibration of a valve body in a check valve that opens and closes a fluid passage by the valve body coming into contact with and separating from a valve seat surface", that "with a pressure acting direction X of the fluid on the upstream side of a valve seat surface 504 with respect to a valve body 540 as X, a side wall surface 526 that regulates the moving range of the valve body 540 in the vertical direction of the pressure acting direction X is formed in a case member 520, a transmitting member 550 that transmits an urging force of a spring 560 to the valve body 540 is arranged between the valve body 540 and the spring 560, and the direction of the urging force transmitted to the valve body 540 is converted so as to be oblique to the pressure acting direction X by the transmitting member 550. Thus, in the open state, the valve body 540 is pressed against the side wall surface 526 by the component force F1 of the urging force transmitted to the valve body 540, and the vibration of the valve body 540 is suppressed."

The fluid force caused by the flow of the hydraulic fluid (e.g., the brake fluid) and the elastic force caused by the elastic body (compression spring) act on the ball (sphere) of the check valve, and the ball moves to a position where these forces are balanced. The sphere, which is the valve body, is thereby separated from the valve seat surface thus opening the valve, and the hydraulic fluid flows in one predetermined direction. In the device described in Patent Literature 1, when the check valve is installed on the discharge side of the fluid pump, the fluid force acting on the sphere fluctuates due to the pulsation of the discharge pressure of the fluid pump, and the sphere vibrates.

The vibration of the sphere of the check valve is affected not only by the vibration of the discharge fluid pressure of the fluid pump but also by the flow rate of the hydraulic fluid (the amount of fluid movement per unit time). In the check valve GQ, the valve body VT is pressed by the compression spring SQ. When the fluid pump QL is not driven, the valve body VT is brought into pressure contact with the valve seat Mz by the elastic force of the compression spring SQ, and the check valve GQ is in a closed state. When the fluid pump QL is driven, the fluid force of the brake fluid BF on the valve body VT becomes larger than the elastic force of the compression spring SQ, and the brake fluid BF flows between the valve body VT and the valve seat Mz. As the rotation number of the fluid pump QL increases and the fluid force of the brake fluid BF increases, the gap between the valve body VT and the valve seat Mz increases, and a large flow rate of brake fluid BF flows.

When the rotation number of the fluid pump QL is reduced and stopped, the flow rate of the brake fluid BF discharged from the fluid pump QL decreases. Immediately before the stop of the fluid pump QL, the gap between the valve body VT and the valve seat Mz becomes small. Since the flow in this gap is not uniform, the valve body VT may vibrate within the conical surface Mz immediately before the stop of the fluid pump QL, causing abnormal noise. It is desired that the vibration of the valve body VT can be suppressed immediately before the rotation of the fluid pump QL is stopped in the check valve GQ.

CITATIONS LIST

Patent Literature

Patent Literature 1: Japanese Unexamined Patent Application Publication No. 2002-195429

SUMMARY OF INVENTION

Technical Problems

An object of the present invention is to provide a brake control device for a vehicle capable of suppressing vibration of a check valve for a fluid pump. SOLUTIONS TO PROBLEMS A brake control device for a vehicle according to the present invention adjusts a fluid pressure (Pw) of a brake fluid (BF) in a wheel cylinder (CW) provided on wheels of the vehicle, the brake control device including a fluid passage (H) that connects a master cylinder (CM) and the wheel cylinder (CW) of the vehicle; a first electromagnetic valve (UP) provided in the fluid passage (H); a second electromagnetic valve (VI) provided in the fluid passage (H) between the first electromagnetic valve (UP) and the wheel cylinder (CW); "a fluid pump (QL) that is driven by an electric motor (ML) to suction the brake fluid (BF) from the fluid passage (H) at a suction part (Bs) between the first electromagnetic valve (UP) and the master cylinder (CM) and discharge the brake fluid (BF) to the fluid passage (H) at a discharge part (Bt) between the first electromagnetic valve (UP) and the second electromagnetic valve (VI)"; a check valve (GQ) provided between the fluid pump (QL) and the discharge part (Bt); and a controller (ECU) that controls the first electromagnetic valve (UP), the second electromagnetic valve (VI), and the electric motor (ML).

In the brake control device for the vehicle according to the present invention, the controller (ECU) is configured to execute a vibration suppression control for setting the first electromagnetic valve (UP) and the second electromagnetic valve (VI) at a close position immediately before the electric motor (ML) is stopped. For example, the controller (ECU) is configured to determine whether a brake operation member (BP) of the vehicle is operated, permit execution of the vibration suppression control when the operation is unperformed, and prohibit execution of the vibration suppression control when the operation is performed.

The first electromagnetic valve (pressure adjusting valve) UP and the second electromagnetic valve (inlet valve) VI are both set to the close position by the vibration suppression control immediately before the electric motor ML is stopped. According to the above configuration, the enclosed state of the brake fluid BF is intentionally formed for a short time on the discharge side of the fluid pump QL. The valve body VT is thus forcibly pressed against the valve seat Mz, and abnormal noise of the check valve GQ is suppressed.

DESCRIPTION OF EMBODIMENT

<Symbols of Configuring Members, Etc., Subscripts at the End of the Symbols, and Motion/Moving Direction>

In the following description, configuring members, calculation processes, signals, characteristics, and values having the same symbol such as "ECU" have the same functions. Subscripts "i" to "l" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders are described as wheel cylinders CWi of the right front wheel, wheel cylinders CWj of the left front wheel, wheel cylinder CWk of the right rear wheel, and wheel cylinder CWl of the left rear wheel. Furthermore, the subscripts "i" to "l" at the end of the symbols can be omitted. When the subscripts "i" to "l" are omitted, each symbol represents a generic name of each of the four wheels. For example, "WH" represents each wheel, and "CW" represents each wheel cylinder.

The subscripts "1" and "2" added to the end of various symbols are comprehensive symbols indicating which of the two braking systems they relate to. Specifically, "1" indicates the first system, and "2" indicates the second system. For example, two master cylinder fluid passages are expressed as a first master cylinder fluid passage HM1 and a second master cylinder fluid passage HM2. Furthermore, the subscripts "1" and "2" at the end of the symbols can be omitted. When the subscripts "1" and "2" are omitted, each symbol represents a generic name of each of the two braking systems. For example, "HM" represents the master cylinder fluid passage of each braking system.

<Embodiment of a Brake Control Device for a Vehicle According to the Present Invention>

Figure 1:
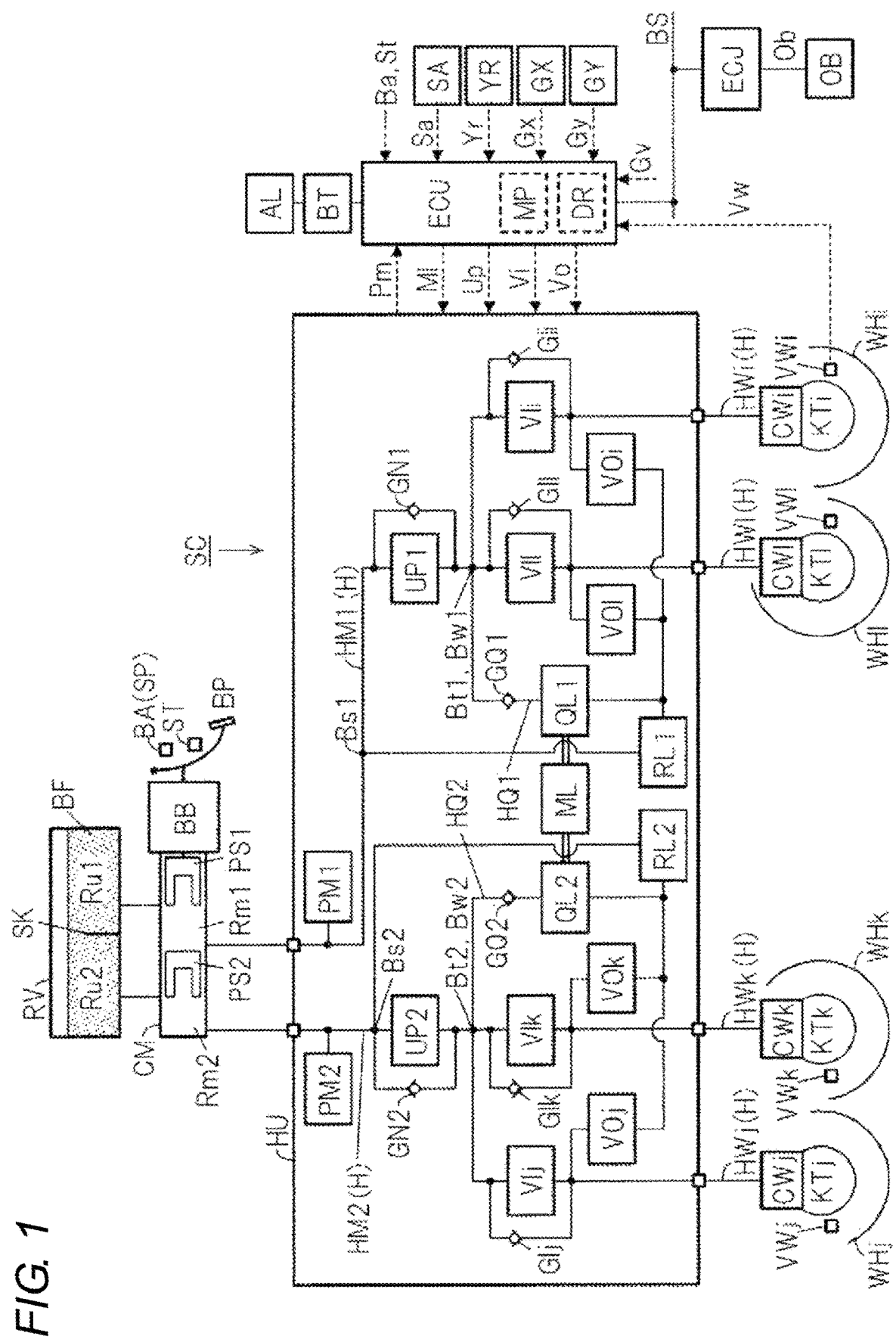
FIG. 1 is an overall configuration view for describing an embodiment of a brake control device SC for a vehicle according to the present invention.

An embodiment of a brake control device SC according to the present invention will be described with reference to an overall configuration view of FIG. 1.

The master cylinder CM and the wheel cylinder CW are connected by a fluid passage H. The fluid passage H is a passage for moving the brake fluid BF which is the hydraulic fluid of the brake control device SC, and corresponds to a brake piping, a fluid path of a fluid unit, a hose, and the like. The inside of the fluid passage H is filled with the brake fluid BF. As will be described later, the fluid passage H is configured to include a master cylinder fluid passage HM and a wheel cylinder fluid passage HW. In the fluid passage H, the side closer to the reservoir RV (the side farther from the wheel cylinder CW) is referred to as the "upstream side" or "upper part", and the side closer to the wheel cylinder CW (the side farther from the reservoir RV) is referred to as the "downstream side" or "lower part".

In a general vehicle, two systems are adopted as the fluid passage H to ensure redundancy. The first system (system related to a first master cylinder chamber Rm1) of the fluid passages H of two systems is connected to the wheel cylinders CWi and CWl. The second system (system related to a second master cylinder chamber Rm2) of the fluid passages of two systems is connected to the wheel cylinders CWj and CWk. That is, a so-called diagonal type (also referred to as "X type") is adopted as the two-system fluid passage H.

The vehicle including the brake control device SC includes a brake operation member BP, a wheel cylinder CW, a reservoir RV, a master cylinder CM, and a brake booster BB.

The brake operation member (e.g., brake pedal) BP is a member operated by the driver to decelerate the vehicle. The braking torque of the wheel WH is adjusted, and the braking force is generated at the wheel WH by operating the brake operation member BP. Specifically, a rotating member (e.g., brake disc) KT is fixed to the wheel WH of the vehicle. A brake caliper is arranged so as to sandwich the rotating member KT.

The brake caliper is provided with the wheel cylinder CW. As the pressure (brake fluid pressure) Pw of the brake fluid BF in the wheel cylinder CW is increased, the friction member (e.g., brake pad) is pressed against the rotating member KT. Since the rotating member KT and the wheel WH are fixed to rotate integrally, the braking torque is generated at the wheel WH by the frictional force generated at this time.

The reservoir (atmospheric pressure reservoir) RV is a tank for the hydraulic fluid, and the brake fluid BF is stored therein. The inside of the atmospheric pressure reservoir RV is divided into two parts by a partition plate SK. The first master reservoir chamber Ru1 is connected to the first master cylinder chamber Rm1, and the second master reservoir chamber Ru2 is connected to the second master cylinder chamber Rm2.

The master cylinder CM is mechanically connected to the brake operation member BP by way of a brake rod, a clevis (U-shaped link) and the like. The master cylinder CM is of a tandem type, and its interior is divided into first and second master cylinder chambers Rm1 and Rm2 by first and second master pistons PS1 and PS2. When the brake operation member BP is not operated, the first and second master cylinder chambers Rm1 and Rm2 of the master cylinder CM and the reservoir RV (first and second master reservoir chambers Ru1 and Ru2) are in a communicating state. The master cylinder CM has output ports of two systems including a first port and a second port, and receives the supply of the brake fluid from the reservoir RV and generates the first and second master cylinder fluid pressures Pm1 and Pm2 from the first and second ports. The first and second master cylinder fluid passages HM1 and HM2 are connected to the master cylinder CM (particularly, first and second ports).

When the brake operation member BP is operated, the first and second pistons PS1, PS2 in the master cylinder CM are pushed, and the first and second pistons PS1, PS2 move forward. With such forward movement, the first and second master cylinder chambers Rm1 and Rm2 formed by the inner wall of the master cylinder CM and the first and second pistons PS1 and PS2 are cut off from the reservoir RV (particularly, the first and second master reservoir chambers Ru1, Ru2). When the operation of the brake operation member BP is increased, the volumes of the master cylinder chambers Rm1 and Rm2 decrease, and the brake fluid BF is pressure fed from the master cylinder CM toward the wheel cylinder CW.

The operation force Fp of the brake operation member BP by the driver is reduced by the brake booster (also simply referred to as "booster") BB. A negative pressure type booster BB is used. The negative pressure is generated by an engine or an electric negative pressure pump. As the booster BB, that which uses an electric motor as a drive source may be employed (e.g., an electric booster, an accumulator type hydraulic booster).

Furthermore, the vehicle includes a wheel speed sensor VW, a steering angle sensor SA, a yaw rate sensor YR, a longitudinal acceleration sensor GX, a lateral acceleration sensor GY, a braking operation amount sensor BA, and an operation switch ST.

Each wheel WH of the vehicle includes a wheel speed sensor VW to detect the wheel speed Vw. The signal of the wheel speed Vw is used for independent control of each wheel such as anti-skid control for suppressing the lock tendency of the wheel WH (i.e., excessive deceleration slip).

A steering operation member (e.g., steering wheel) includes a steering angle sensor SA so as to detect a steering angle Sa. The vehicle body of the vehicle includes a yaw rate sensor YR so as to detect a yaw rate (yaw angular velocity) Yr. In addition, the longitudinal acceleration sensor GX and the lateral acceleration sensor GY are provided so as to detect the acceleration (longitudinal acceleration) Gx in the longitudinal direction (advancing direction) of the vehicle and the acceleration (lateral acceleration) Gy in the lateral direction (direction perpendicular to the advancing direction). These signals are used for vehicle motion control such as vehicle stabilization control (so-called ESC) for suppressing excessive oversteer behavior and understeer behavior.

A braking operation amount sensor BA is provided so as to detect an operation amount Ba of the brake operation member BP (brake pedal) by the driver. As the braking operation amount sensor BA, at least one of a master cylinder fluid pressure sensor PM that detects a fluid pressure (master cylinder fluid pressure) Pm in the master cylinder CM, an operation displacement sensor SP that detects an operation displacement Sp of the brake operation member BP, and an operation force sensor (not shown) that detects an operation force Fp of the brake operation member BP is employed. That is, at least one of the master cylinder fluid pressure Pm, the operation displacement Sp, and the operation force Fp is detected as the braking operation amount Ba by the operation amount sensor BA.

An operation switch ST is provided on the brake operation member BP. The operation switch ST detects whether the driver operated the brake operation member BP. When the brake operation member BP is not operated (that is, at the time of non-braking), an off signal is output as the operation signal St by the braking operation switch ST. On the other hand, when the brake operation member BP is operated (that is, at the time of braking), an on signal is output as the operation signal St.

The wheel speed Vw, the steering angle Sa, the yaw rate Yr, the longitudinal acceleration Gx, the lateral acceleration Gy, the braking operation amount Ba, and the braking operation signal St detected by each sensor (VW etc.) are input to the controller ECU. In the controller ECU, the vehicle body speed Vx is calculated based on the wheel speed Vw.

The brake control device SC includes the controller ECU and a fluid unit HU.

<<Electronic Control Unit ECU>>

The controller (also referred to as "electronic control unit") ECU is configured by an electric circuit substrate on which a microprocessor MP or the like is mounted, and a control algorithm programmed in the microprocessor MP. The controller ECU is network connected so as to share signals (detected values, calculated values, etc.) with other controllers through an in-vehicle communication bus BS. For example, the braking controller ECU is connected to a driving support controller ECJ through the communication bus BS. The vehicle body speed Vx is transmitted from the controller ECU to the controller ECJ. On the other hand, the target deceleration Gv for automatic braking is transmitted from the driving support controller ECJ to the braking controller ECU so as to avoid collision with an obstacle (or to reduce damage at the time of collision).

An obstacle sensor OB is connected to the driving support controller ECJ. A camera, a radar, or the like is employed as the obstacle sensor OB. The obstacle sensor OB detects a distance (relative distance) Ob between the vehicle (own vehicle) and the obstacle (other vehicle, fixed object, pedestrian, etc.). In the controller ECJ, the target deceleration Gv is calculated based on the relative distance Ob and the vehicle body speed Vx. For example, in the controller ECJ a collision spare time Tc and a headway time Tw are calculated based on the relative distance Ob and the vehicle body speed Vx.

The collision spare time Tc is a time required until a collision between the own vehicle and the obstacle occurs. Specifically, the collision spare time Tc is determined by dividing the distance Ob between the obstacle and the own vehicle by the speed difference between the obstacle and the own vehicle (i.e., relative speed). Here, the relative speed is calculated by time-differentiating the relative distance Ob. The target deceleration Gv is calculated based on the collision spare time Tc so that the target deceleration Gv becomes smaller the larger the collision spare time Tc (or the target deceleration Gv becomes larger the smaller the collision spare time Tc).

The target deceleration Gv can be adjusted based on the headway time Tw. The headway time Tw is a time required for the own vehicle to reach the current position of the obstacle ahead. Specifically, the headway time Tw is calculated by dividing the relative distance Ob by the vehicle body speed Vx. The target deceleration Gv is adjusted based on the headway time Tw so that the target deceleration Gv becomes smaller the larger the headway time Tw (or the target deceleration Gv becomes larger the smaller the headway time Tw). When the obstacle is stationary, the collision spare time Tc matches the headway time Tw.

As described above, in vehicle stabilization control, automatic braking control for collision avoidance (damage reduction), and the like, the fluid pressure (brake fluid pressure) Pw in the wheel cylinder CW is increased to be greater than the fluid pressure (i.e., master cylinder fluid pressure Pm) corresponding to the operation of the brake operation member BP by the driver. Such braking control (control for achieving "Pw>Pm") is referred to as "automatic pressurization control". In the controller ECU, a control flag (signal) FL indicating such operation is formed based on the execution state of the automatic pressurization control. For example, when the automatic pressurization control is not being executed, the operation flag FL is set to "0". When the automatic pressurization control is being executed, the operation flag FL is set to "1". Therefore, the point time when the operation flag FL is switched from "0" to "1" (corresponding calculation cycle) is the start of the automatic pressurization control, and the time point when the operation flag FL is switched from "1" to "0" is the end of the automatic pressurization control.

The controller ECU (electronic control unit) controls the electric motor ML of the fluid unit HU and three different types of electromagnetic valves UP, VI, and VO. Specifically, drive signals Up, Vi, and Vo for controlling various electromagnetic valves UP, VI, and VO are calculated based on a control algorithm in the microprocessor MP. Similarly, a drive signal Ml for controlling the electric motor ML is calculated.

The controller ECU includes a driving circuit DR for driving the electromagnetic valves UP, VI, VO, and the electric motor ML. In the driving circuit DR, a bridge circuit is formed by switching elements (power semiconductor devices such as MOS-FET and IGBT) to drive the electric motor ML. The energization state of each switching element is controlled based on the motor drive signal Ml, and the output of the electric motor ML is controlled. Furthermore, in the driving circuit DR, the energized state (i.e., excited state) is controlled based on the drive signals Up, Vi, and Vo so as to drive the electromagnetic valves UP, VI, and VO. The driving circuit DR includes an energization amount sensor that detects the actual energization amount of the electric motor ML and the electromagnetic valves UP, VI, and VO. For example, a current sensor is provided as an energization amount sensor, and a supply current to the electric motor ML and the electromagnetic valves UP, VI, and VO is detected.

A braking operation amount Ba, a braking operation signal St, a wheel speed Vw, a yaw rate Yr, a steering angle Sa, a longitudinal acceleration Gx, a lateral acceleration Gy, and the like are input to the braking controller ECU. Furthermore, the target deceleration Gv is input from the driving support controller ECJ via the communication bus BS.

For example, in the controller ECU, anti-skid control is executed based on the wheel speed Vw so as to suppress excessive deceleration slip of the wheel WH (e.g., wheel lock). In the anti-skid control, first, the vehicle body speed Vx is calculated based on the wheel speed Vw. A deceleration slip (e.g., a difference between the wheel speed Vx and the vehicle body speed Vw) Sw of each wheel WH is calculated based on the wheel speed Vw and the vehicle body speed Vx. When the wheel slip Sw exceeds a threshold value sx and becomes excessively large, the brake fluid pressure Pw is reduced by the electromagnetic valves VI and VO described later. When the wheel slip Sw becomes less than a threshold value sy and the grip of the wheel WH is restored, the brake fluid pressure Pw is increased by the electromagnetic valves VI and VO.

In the controller ECU, the vehicle stabilization control (so-called ESC, one of the above-described automatic pressurization controls) that suppresses the unstable behavior of the vehicle (excessive oversteer behavior, understeer behavior) is executed based on the actual yaw rate Yr, and the like. In the vehicle stabilization control, first, a target yaw rate Yt is calculated based on the vehicle body speed Vx and the steering angle Sa. A deviation hY between the target yaw rate Yt and the actual yaw rate Yr (detected value) is calculated. Then, an excessive oversteer behavior and an excessive understeer behavior are determined based on the yaw rate deviation hY. Based on the determination result, the brake fluid pressure Pw of each wheel is independently controlled, the vehicle is decelerated, and a yaw moment for stabilizing the vehicle is formed. For example, even when the brake operation member BP is not operated, the brake fluid pressure Pw is automatically increased by the fluid unit HU and the brake fluid pressure Pw of each wheel is individually adjusted so as to generate a moment for stabilizing the vehicle.

In addition, in the controller ECU, the automatic braking control (one of the above-described automatic pressurization controls) is executed based on the target deceleration Gv so as to avoid collision with an obstacle (or to reduce damage at the time of collision). Specifically, first, the target deceleration Gv (target value) is compared with the actual deceleration Gx (detected value). Then, regardless of whether or not the brake operation member BP is operated, the brake fluid pressure Pw is increased by the fluid unit HU so that the actual deceleration Gx approaches the target deceleration Gv. In the automatic braking control, an estimated deceleration Ge (actual value) calculated based on the wheel speed Vw may be employed instead of the detected value Gx of the longitudinal acceleration sensor GX. In any case, the feedback control based on the deceleration is executed so that the actual deceleration matches the target value Gv.

<<Fluid Unit HU>>

The first and second master cylinder fluid passages HM1 and HM2 are connected to the fluid unit HU. The master cylinder fluid passages HM1 and HM2 are branched into wheel cylinder fluid passages HWi to HWl at parts Bw1 and Bw2 in the fluid unit HU and connected to the wheel cylinders CWi to CWl. Specifically, the first master cylinder fluid passage HM1 is branched into wheel cylinder fluid passages HWi and HWl at a first branch part Bw1. The wheel cylinders CWi and CWl are connected to the wheel cylinder fluid passages HWi and HWl. Similarly, the second master cylinder fluid passage HM2 is branched into wheel cylinder fluid passages HWj and HWk at the second branch part Bw2. The wheel cylinders CWj, CWk are connected to the wheel cylinder fluid passages HWj, HWk. Here, the master cylinder fluid passages HM1, HM2 and the wheel cylinder fluid passages HWi, HWj, HWk, HWl are a part of the fluid passage H.

The fluid unit HU includes an electric pump DL, a low-pressure reservoir RL, a pressure adjusting valve UP, a master cylinder fluid pressure sensor PM, an inlet valve VI, and an outlet valve VO. The arrangement of each configuring member (electromagnetic valves UP, VI, etc.) will be described.

The pressure adjusting valve UP is provided in a fluid passage H (particularly, the master cylinder fluid passage HM) that connects the master cylinder CM and the wheel cylinder CW. The inlet valve VI is provided between the pressure adjusting valve UP and the wheel cylinder CW in the fluid passage H (particularly, the wheel cylinder fluid passage HW). That is, in the fluid passage H, the pressure adjusting valve UP and the inlet valve VI are arranged in series, and are arranged in the order of "pressure adjusting valve UP, inlet valve VI" from the upstream side. The fluid pump QL is driven by the electric motor ML. The fluid pump QL suctions (pumps) the brake fluid BF from the fluid passage H at a part (referred to as "suction part") Bs between the pressure adjusting valve UP and the master cylinder CM. Then, the fluid pump QL discharges (supplies) the brake fluid BF to the fluid passage H at a part (referred to as a "discharge part") Bt between the pressure adjusting valve UP and the inlet valve VI. The check valve GQ is provided between the fluid pump QL and the discharge part Bt. That is, the check valve GQ is interposed in the pump fluid passage HQ that connects the fluid pump QL and the discharge part Bt. In the drawing, the branch part Bw of the master cylinder fluid passage HM and the wheel cylinder fluid passage HW overlaps the suction part Bt of the fluid pump QL, but these may be separate parts.

The electric pump DL includes one electric motor ML and two fluid pumps QL1 and QL2. The electric motor ML is controlled by the controller ECU based on the drive signal Ml. The first and second fluid pumps QL1 and QL2 are integrally rotated and driven by the electric motor ML. Therefore, the rotations of the electric pump DL, the fluid pump QL, and the electric motor ML are the same. The electric motor ML is provided with a rotation angle sensor NA to detect the rotation number Na.

The brake fluid BF is pumped up from the first and second suction parts Bs1 and Bs2 of the fluid passage H located upstream of the first and second pressure adjusting valves UP1 and UP2 by the first and second fluid pumps QL1 and QL2 of the electric pump DL. The pumped brake fluid BF is discharged to the first and second discharge parts Bt1 and Bt2 of the fluid passage H located downstream of the first and second pressure adjusting valves UP1 and UP2. Here, the electric pump DL is rotated only in one direction.

On the discharge side of the fluid pump QL (between the fluid pump QL and the discharge part Bt), a check valve GQ (generic name for first and second check valves GQ1, GQ2) that allows only one-way flow is provided to prevent reverse flow of the brake fluid BF. The check valve GQ is arranged in a pump fluid passage HQ provided in parallel with respect to the pressure adjusting valve UP. Here, the pump fluid passage HQ is a fluid passage from the suction part Bs to the discharge part Bt including the fluid pump QL. The check valve GQ allows the movement of the brake fluid BF from the fluid pump QL to the discharge part Bt, but prevents the movement of the brake fluid BF from the discharge part Bt to the fluid pump QL. The first and second low-pressure reservoirs RL1, RL2 are provided on the suction sides of the first and second fluid pumps QL1, QL2.

The first and second pressure adjusting valves UP1 and UP2 (correspond to "first electromagnetic valve") are provided in the fluid passage H (particularly, the first and second master cylinder fluid passages HM1 and HM2). As the pressure adjusting valve UP (generic name for first and second pressure adjusting valves UP1 and UP2), a linear type electromagnetic valve (also referred to as "proportional valve" or "differential pressure valve") in which the valve-open amount (lift amount) is continuously controlled based on an energized state (e.g., supply current) is employed. The pressure adjusting valve UP is controlled by the controller ECU based on the drive signal Up (generic name for first and second drive signals Up1 and Up2). Here, normally-open electromagnetic valves are employed as the first and second pressure adjusting valves UP1 and UP2.

A compression spring (e.g., a coil spring) always acts in the valve opening direction on the valve body of the pressure adjusting valve UP. In addition, fluid force in the valve opening direction based on the differential pressure between the fluid pressure downstream of the pressure adjusting valve UP (i.e., the brake fluid pressure Pw) and the fluid pressure upstream of the pressure adjusting valve UP (i.e., the master cylinder pressure Pm) acts. In addition, a suction force in the valve closing direction, which proportionally increases in accordance with the energization amount to the pressure adjusting valve UP (accordingly, the supply current), acts on the valve body of the pressure adjusting valve UP. Therefore, the valve-open amount of the pressure adjusting valve UP is determined by the balance of the elastic force, the fluid force, and the suction force.

In the controller ECU, the target energization amount of the pressure adjusting valve UP is determined based on the calculation result of the automatic pressurization control such as the vehicle stabilization control and the automatic braking control (e.g., the target fluid pressure of the wheel cylinder CW). The drive signal Up is determined based on the target energization amount. Then, in accordance with the drive signal Up, the energization amount (current) to the pressure adjusting valve UP is adjusted, and the valve-open amount of the pressure adjusting valve UP is adjusted.

When the fluid pump QL is driven, a reflux (flow of the circulating brake fluid BF) of "Bs→RL→QL→GQ→Bt→UP→Bs" is formed through the pump fluid passage HQ. When the pressure adjusting valve UP is not energized and the normally-open type pressure adjusting valve UP is in the fully opened state, the fluid pressure upstream of the pressure adjusting valve UP (i.e., the master cylinder fluid pressure Pm) and the fluid pressure upstream of the pressure adjusting valve UP (i.e., the brake fluid pressure Pw when the electromagnetic valves VI and VO are not driven) substantially match.

When the energization amount to the normally-open type pressure adjusting valve UP is increased, the above-described suction force is increased. As a result, the valve-open amount of the pressure adjusting valve UP is reduced. The reflux of the brake fluid BF is reduced by the pressure adjusting valve UP, and the downstream fluid pressure Pw is increased from the upstream fluid pressure Pm by the orifice effect. That is, the differential pressure (Pw>Pm) between the upstream fluid pressure Pm and the downstream fluid pressure Pw is adjusted by the electric pump DL and the pressure adjusting valve UP. The automatic pressurization control (control for increasing the brake fluid pressure Pw above the master cylinder fluid pressure Pm according to the operation of the brake operation member BP) is achieved by controlling the electric pump DL and the pressure adjusting valve UP. For example, when the brake operation member BP is not operated, "Pm=0", but the brake fluid pressure Pw is increased to a value larger than "0" by the automatic pressurization control.

The check valve GN that allows only one-way flow is provided in parallel with the pressure adjusting valve UP so that the brake fluid pressure Pw is rapidly increased in response to a sudden increase in the brake operation member BP. The check valve GN allows the movement of the brake fluid BF from the master cylinder CM toward the wheel cylinder CW (i.e., from the upstream side to the downstream side), but inhibits the movement of the brake fluid BF from the wheel cylinder CW to the master cylinder CM. (i.e., from the downstream side to the upstream side).

First and second master cylinder fluid pressure sensors PM1, PM2 are provided upstream of the pressure adjusting valve UP so as to detect the first and second master cylinder fluid pressures Pm1, Pm2. Since "Pm1=Pm2", one of the first and second master cylinder fluid pressure sensors PM1 and PM2 can be omitted.

The master cylinder fluid passage HM (part of the fluid passage H) is branched (divided) to the wheel cylinder fluid passage HW (part of the fluid passage H) of each front wheel at a part (branch part) Bw downstream of the pressure adjusting valve UP. An inlet valve VI (correspond to "second electromagnetic valve") and an outlet valve VO are provided in the wheel cylinder fluid passage HW. As the inlet valve VI, a normally-open on/off electromagnetic valve is employed. In addition, as the outlet valve VO, a normally-closed on/off electromagnetic valve is employed. Here, the on/off electromagnetic valve is a two-port two-position switching type electromagnetic valve having two positions, an open position and a close position.

The electromagnetic valves VI and VO are controlled by the controller ECU based on the drive signals Vi and Vo. The brake fluid pressure Pw of each wheel can be independently controlled by the inlet valve VI and the outlet valve VO.

In the inlet valve VI and the outlet valve VO, the configuration related to each wheel WH is the same. Each wheel WH will be collectively described. A normally-open inlet valve VI is provided in the wheel cylinder fluid passage HW (fluid passage connecting the part Bw and the wheel cylinder CW). The wheel cylinder fluid passage HW is connected to the low-pressure reservoir RL through a normally-closed outlet valve VO at a downstream part of the inlet valve VI.

For example, in the independent control of each wheel (anti-skid control, vehicle stabilization control, etc.), the inlet valve VI is at the close position and the outlet valve VO is at the open position to reduce the fluid pressure Pw in the wheel cylinder CW. The inflow of the brake fluid BF from the inlet valve VI is inhibited, the brake fluid BF in the wheel cylinder CW flows out to the low-pressure reservoir RL, and the brake fluid pressure Pw is reduced. Furthermore, in order to increase the brake fluid pressure Pw, the inlet valve VI is set to the open position and the outlet valve VO is set to the close position. The outflow of the brake fluid BF to the low-pressure reservoir RL is inhibited, the downstream fluid pressure adjusted by the pressure adjusting valve UP is introduced into the wheel cylinder CW, and the brake fluid pressure Pw is increased.

When the operated brake operation member BP is released, a check valve GI that allows only one-way flow is provided in parallel with respect to the inlet valve VI so that the brake fluid pressure Pw is rapidly reduced. The check valve GI allows the movement of the brake fluid BF from the wheel cylinder CW toward the master cylinder CM (i.e., from the upstream side toward the downstream side), but inhibits the movement of the brake fluid BF from the master cylinder CM toward the wheel cylinder CW (i.e., from the downstream side toward the upstream side).

<Process of Vibration Suppression Control>

Figure 2:
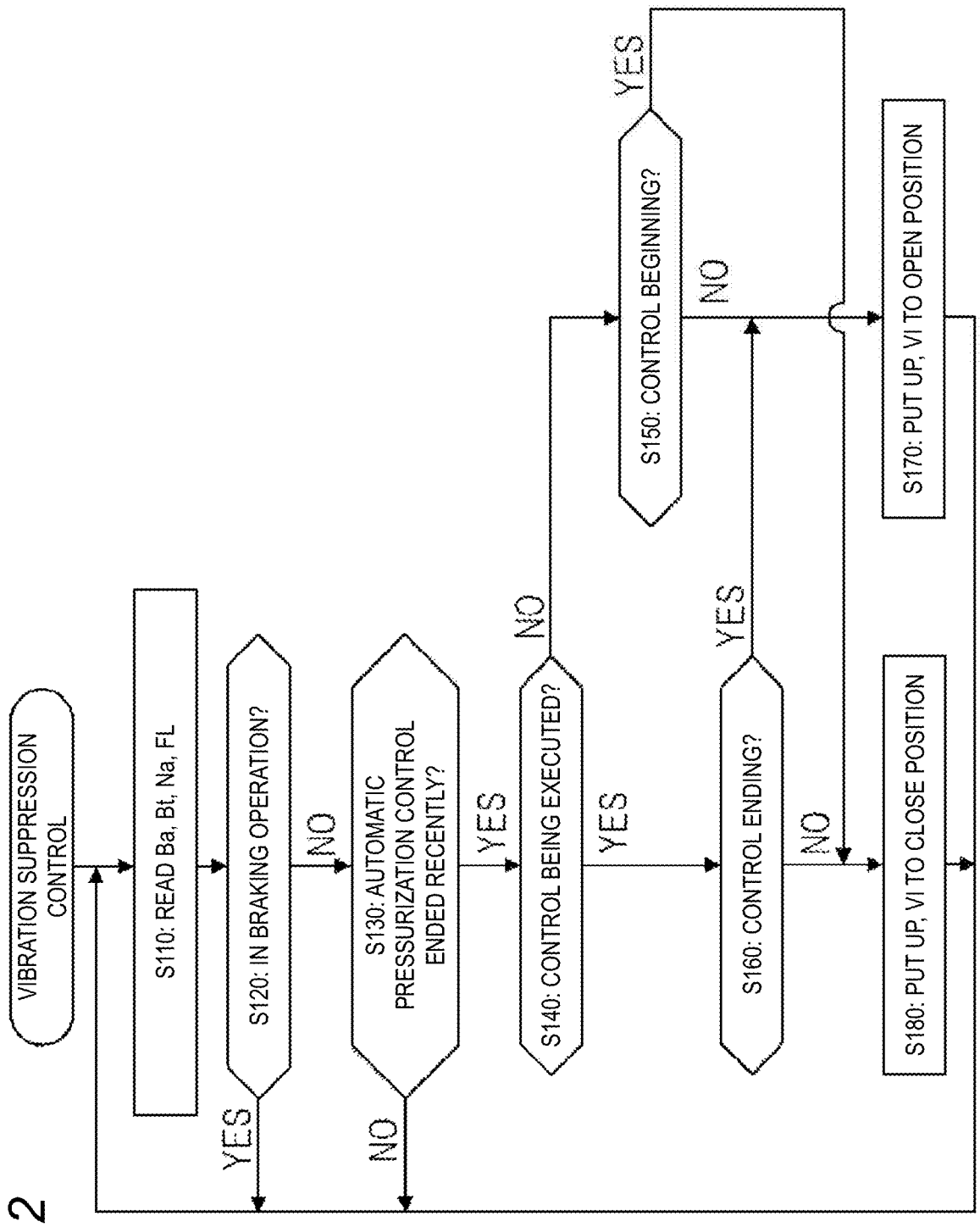
FIG. 2 is a control flowchart for explaining a calculation process of a vibration suppression control.

The calculation process of the vibration suppression control will be described with reference to the control flowchart of FIG. 2. "Vibration suppression control" is the control of the pressure adjusting valve UP and the inlet valve VI for suppressing the vibration of the check valve GQ (particularly, the valve body VT) immediately before the rotation of the electric pump DL is stopped. The control algorithm is programmed in the controller ECU.

In step S110, the braking operation amount Ba, the operation signal St, the rotation number Na, and the operation flag FL of the automatic pressurization control are read. The operation amount Ba is detected by the operation amount sensor BA (e.g., master cylinder fluid pressure sensor PM, operation displacement sensor SP). The operation signal St is detected by an operation switch ST provided in the brake operation member BP. The rotation number Na is detected by a rotation number sensor NA provided in the electric motor ML. The operation flag FL is a control flag representing the operation of the automatic pressurization control, and is calculated in the controller ECU.

In step S120, "whether or not braking is being performed" is determined based on at least one of the braking operation amount Ba and the braking operation signal St. For example, when the operation amount Ba is greater than or equal to a predetermined value bo, positive determination is made in step S120 and the process returns to step S110. On the other hand, when "Ba<bo", negative determination is made in step S120 and the process proceeds to step S130. Here, the predetermined value bo is a constant set in advance that corresponds to the play of the brake operation member BP. When the operation signal St is off, the process proceeds to step S130, and when the operation signal St is on, the process returns to step S110.

In step S120, whether the brake operation member BP has been operated is determined. When operation has not been performed, the execution of the vibration suppression control is permitted and continued. On the other hand, when operation has been performed, the execution of the vibration suppression control is prohibited.

In step S130, "whether or not the automatic pressurization control that has been executed in the latest calculation cycle is completed (or whether or not it is close to completion)" is determined based on the operation flag FL. For example, in the latest calculation cycle or the current calculation cycle, the operation flag FL is changed from "1" to "0", and when the condition is affirmed, the process proceeds to step S140. When it is clear that the automatic pressurization control is ended after several cycles, the determination may be affirmed.

On the other hand, "when the automatic pressurization control is not started and not executed" or "when the execution of the automatic pressurization control is continuously continued", step S130 is denied, and the process returns to step S110. The vibration suppression control is based on suppressing the vibration of the check valve GQ immediately before the rotation of the electric pump DL is stopped.

In step S140, "whether or not vibration suppression control is being executed" is determined. When the vibration suppression control is being executed, step S140 is affirmed, and the process proceeds to step S160. On the other hand, when the vibration suppression control is not being executed, step S140 is denied, and the process proceeds to step S150.

In step S150, "whether or not start condition of the vibration suppression control is satisfied" is determined based on the rotation number Na (actual value). Specifically, when "the actual rotation number Na is greater than or equal to a first predetermined rotation number na and less than or equal to a second predetermined rotation number nb", the start condition is satisfied. Here, the first predetermined rotation number na is a preset constant larger than "0 (stop rotation)". Furthermore, the second predetermined rotation number nb is a preset constant larger than the first predetermined rotation number na. When "na≤Na≤nb" is satisfied, the process proceeds to step S180. On the other hand, when "Na<na" or "Na>nb", the vibration suppression control is not started, and the process proceeds to step S170. That is, the vibration suppression control is executed immediately before the electric motor ML is stopped, but the vibration suppression control is not executed if immediately before the stop of the electric motor ML is denied. Here, in a series of automatic pressurization control (from the start of control to the end of control), the duration Tk of the vibration suppression control is counted (integrated) from a time point step S150 is satisfied for the first time (the calculation cycle, at the start of vibration suppression control).

In the vibration suppression control, the valve body VT is pressed against the valve seat Mz by enclosing the brake fluid BF. In order for the situation to be formed, it is necessary that the brake fluid BF is slightly discharged from the fluid pump QL. When the rotation number Na is less than the first predetermined rotation number na (e.g., when the fluid pump QL is already stopped), the effect of the vibration suppression control cannot be obtained. When the rotation number Na is larger than the second predetermined rotation number nb, more enclosure than necessary may occur. Therefore, the vibration suppression control is started at the time point the rotation number Na falls within a predetermined range (within a range from the first predetermined rotation number na to the second predetermined rotation number nb).

In step S160, "whether or not the end condition of the vibration suppression control is satisfied" is determined based on the duration Tk. The duration Tk from the start of the vibration suppression control is compared with a predetermined time tk, and the above determination is executed. Here, the predetermined time tk is a determination threshold value and is a preset constant. When the duration Tk is less than the predetermined time tk, the determination is denied, the process proceeds to step S180, and the vibration suppression control is continued. When the duration Tk is greater than or equal to the predetermined time tk, the end condition is satisfied, the process proceeds to step S170, and the vibration suppression control is ended.

In step S170, the pressure adjusting valve UP and the inlet valve VI are both set to the open position. Step S170 corresponds to a case where the vibration suppression control is not executed. In this case, the brake fluid BF discharged from the fluid pump QL is moved toward the master cylinder CM or the wheel cylinder CW.

In step S180, the pressure adjusting valve UP and the inlet valve VI are both set to the close position. Step S180 corresponds to a case where the vibration suppression control is executed. In this case, the brake fluid BF discharged from the fluid pump QL is moved to a fluid passage between the pressure adjusting valve UP, the inlet valve VI, and the fluid pump QL. Since the fluid passage is enclosed, the internal fluid pressure of the fluid passage is increased by the inflow of the brake fluid BF. This fluid pressure acts to press the valve body VT against the valve seat Mz. In the valve seat Mz, the vibrating valve body VT is brought into close contact with the valve seat Mz, so that the vibration of the valve body VT stops.

For example, when the vibration suppression control is ended, the pressure adjusting valve UP and the inlet valve VI are simultaneously (at the same calculation cycle) de-energized and changed from the close position to the open position. Furthermore, at the end of the vibration suppression control, first, the pressure adjusting valve UP may be changed from the close position to the open position, and thereafter, the inlet valve VI may be changed from the close position to the open position. When the vibration suppression control is executed, the brake operation member BP is not operated, and the master cylinder chamber Rm and the reservoir RV are in a communicating state. Thus, first, the pressure adjusting valve UP is set to the open position, and the enclosed fluid pressure is released toward the reservoir RV. As a result, the influence of the enclosed fluid pressure on the brake fluid pressure Pw can be avoided.

In order to calculate the rotation number Na, a rotation angle sensor KA is provided instead of the rotation number sensor NA. In this case, the rotation angle Ka detected by the rotation angle sensor KA is time-differentiated to determine the actual rotation number Na. Furthermore, the rotation number Na is calculated based on the energization amount Im to the electric motor ML. The motor energization amount Im (actual value) is detected by an energization amount sensor provided in the driving circuit DR. When the electric motor ML is rotated, a periodic fluctuation occurs in the motor energization amount Im. Such fluctuation is detected, and the rotation number Na (actual value) is calculated.

The actual rotation number Na can be calculated based on the elapsed time Tm from the time point energization of the electric motor ML is stopped. Even when the energization to the electric motor ML is stopped, the electric pump DL starts to stop while reducing the rotation number due to the inertia of the electric motor ML itself and the inertia of the fluid pump QL. Since the performance and specifications of each component such as the electric motor ML, the fluid pump QL, the check valve GQ, and the like are known, the actual rotation number Na is estimated based on the time Tm from the time point energization to the electric motor ML is stopped (calculation process timing).

The normally-open type pressure adjusting valve UP is closed when reaching a certain energized state or more. As described above, the fluid force corresponding to the differential pressure (the pressure difference between the upstream part and the downstream part with respect to the pressure adjusting valve UP) acts on the pressure adjusting valve UP, and such open state is determined by the energization amount (current value) to the pressure adjusting valve UP. In the vibration suppression control, the maximum fluid pressure (referred to as "open pressure") that can maintain the closed state of the pressure adjusting valve UP is set to the value "pu". Similarly to the pressure adjusting valve UP, in the vibration suppression control, the maximum fluid pressure (open pressure) at which the normally-open type inlet valve VI can be kept closed is set to the value "pv" based on the energization amount (supply current) to the inlet valve VI. Then, the open pressure pv of the inlet valve VI is set to be larger than the open pressure pu of the pressure adjusting valve UP. As a result, in the event that the enclosed fluid pressure becomes excessively large, the enclosed fluid is opened toward the reservoir RV through the master cylinder chamber Rm. As a result, the influence of the enclosed fluid pressure on the brake fluid pressure Pw can be avoided.

Operation/Effect

Figure 3:
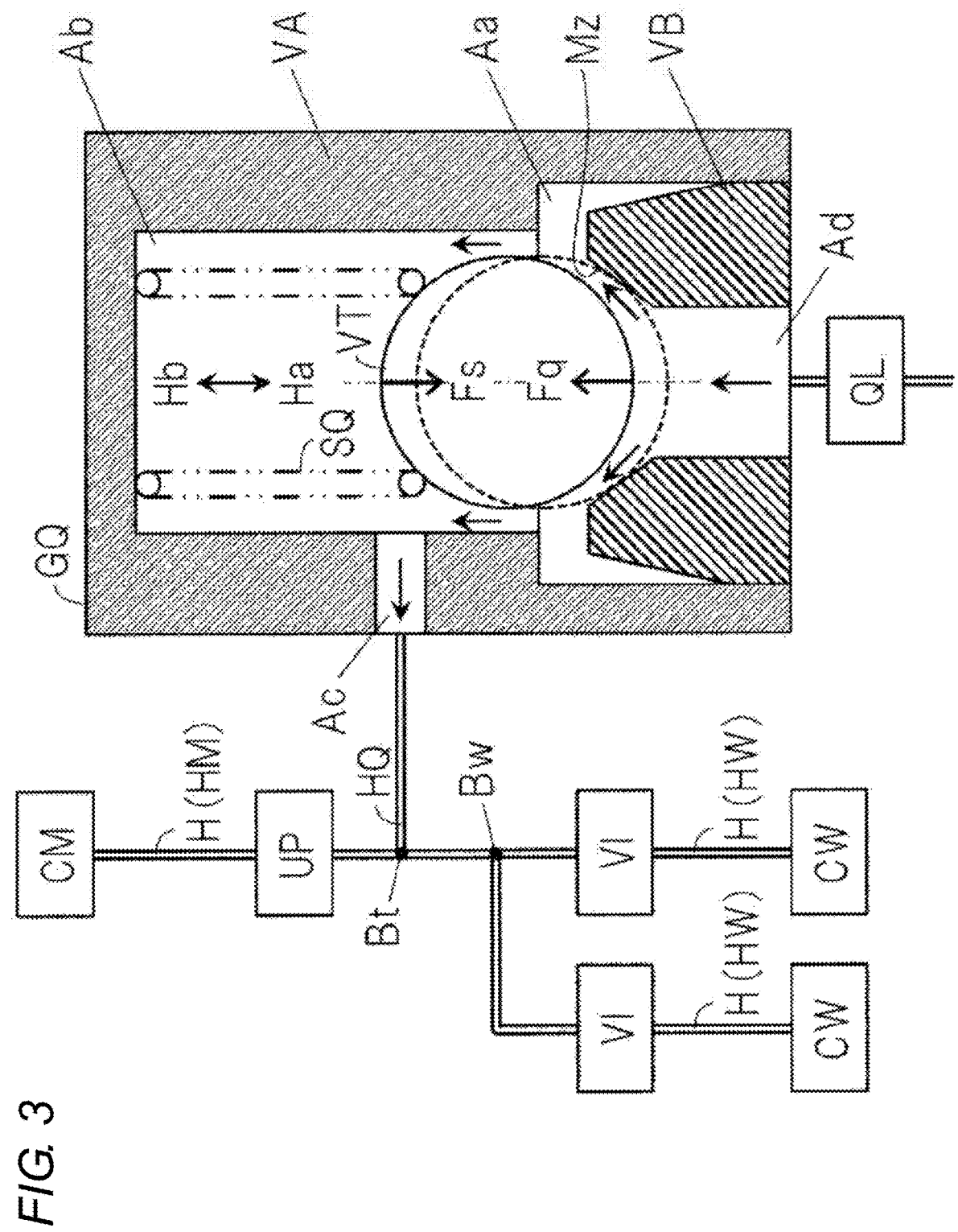
FIG. 3 is a schematic view for explaining the operation and effect.

The operation and effect of the vibration suppression control of the brake control device SC will be described with reference to the schematic view of FIG. 3. Here, the vibration suppression control is for suppressing the vibration (swing) of the valve body VT (e.g., ball) which occurs immediately before the electric motor ML is stopped.

First, the arrangement and configuration of the check valve GQ will be described.

The master cylinder CM and the wheel cylinder CW are connected by the fluid passage H. The check valve GQ is arranged on the discharge side of the fluid pump QL in a pump fluid passage HQ provided in parallel with H. The pump fluid passage HQ is connected to the fluid passage H at a part (discharge part Bt) on the discharge side of the fluid pump QL. The discharge part Bt is located between the pressure adjusting valve UP and the inlet valve VI in the fluid passage H. That is, the check valve GQ is provided between the fluid pump QL and the discharge part Bt in the fluid passage H.

The check valve GQ includes a first member VA, a second member VB, a valve body VT, and a compression spring SQ. The first member VA is provided with a first hole Aa, a second hole Ab, and an output hole Ac. The second member VB is inserted into the first hole Aa of the first member VA. The second member VB is formed with a valve seat surface Mz having a conical shape. An input hole Ad is provided at the center of the valve seat Mz so as to be connected to the fluid pump QL. A valve body (ball) VT and a compression spring SQ are provided in the second hole Ab of the first member VA. Furthermore, the first member VA is provided with an output hole Ac so as to be connected to the discharge part Bt of the fluid passage H through the pump fluid passage HQ.

The valve body VT of the check valve GQ is pressed in the first direction Ha by the elastic force Fs of the compression spring SQ. When the fluid pump QL is not driven, the valve body VT is brought into pressure contact with the valve seat Mz of the second member VB by the compression spring SQ, and the check valve GQ is in a closed state (see the broken line). When the fluid pump QL is driven, the brake fluid BF flows into the check valve GQ from the input hole Ad. At this time, when the fluid force (force received from the fluid) Fq on the valve body VT exceeds the elastic force Fs of the compression spring SQ, the valve body VT moves in the second direction Hb (the direction opposite to the first direction Ha), the brake fluid BF flows between the valve body VT and the valve seat Mz, and the brake fluid BF is discharged from the output hole Ac. Here, the larger the fluid force Fq of the brake fluid BF, the larger the gap between the valve body VT and the valve seat Mz so that a large flow rate of brake fluid BF flows.

When the fluid pump QL is stopped, the flow rate of the brake fluid BF discharged from the fluid pump QL decreases. Therefore, immediately before the fluid pump QL is stopped, the gap between the valve body VT and the valve seat Mz becomes small. If the fluid force Fq and the elastic force Fs act so as to completely oppose each other (if the fluid force Fq and the elastic force Fs act coaxially), the valve body VT is abutted against the valve seat Mz without vibrating. However, since the flow in the gap is not uniform, the fluid force Fq acts on the valve body VT with a deviation (left-right direction in the figure) from the second direction Hb (vertical direction in the figure). Therefore, immediately before the fluid pump QL is stopped, the valve body VT swings in the valve seat Mz, and the valve body VT strikes against the valve seat Mz by such swinging, which may generate abnormal noise.

Immediately before the electric motor ML is stopped, the vibration suppression control is executed so as to suppress the generation of the abnormal noise. In the vibration suppression control, the pressure adjusting valve UP and the inlet valve VI are set to the close position, and the enclosed state of the brake fluid BF is intentionally formed for a short time on the discharge side of the fluid pump QL. Thus, the valve body VT is instantly forcibly pressed against the valve seat Mz, and the vibration (swing) of the valve body VT is suppressed.

In the vibration suppression control, whether the brake operation member BP is operated is determined, where the execution is permitted when the operation is unperformed and the execution is prohibited when the operation is performed. In a state where the brake operation member BP is operated, the brake fluid pressure Pw (=Pm) is generated by the master cylinder CM. Since the valve body VT is already pressed against the valve seat Mz by the fluid pressure, the effect of the vibration suppression control is limited. Furthermore, although the execution of the vibration suppression control is a short time, if the operation of the brake operation member BP is increased during the execution, a "situation where the operation displacement Sp is not increased but the operation force Fp is increased" may occur. The driver feels this uncomfortable (so-called stomping feeling). When the braking operation is performed, the vibration suppression control is prohibited, so that an uncomfortable feeling to the driver can be suppressed.

The execution of the vibration suppression control may be permitted when the temperature (fluid temperature) Tb of the brake fluid BF is higher than or equal to a predetermined temperature tb, and may be prohibited when the temperature is lower than the predetermined temperature tb. Here, the predetermined temperature tb is a threshold value for determination and is a preset constant. This is based on the fact that when the fluid temperature Tb is low, the viscosity of the brake fluid BF is high and the vibration of the valve body VT is less likely to occur, whereas when the fluid temperature Tb is high, the viscosity of the brake fluid BF is low and the vibration of the valve body VT is likely to occur. Since whether or not the vibration suppression control is performed is determined based on the temperature Tb of the brake fluid BF, the vibration suppression control can be executed only when necessary. The temperature Tb of the brake fluid BF is detected by a temperature sensor. Here, the temperature sensor may be built in the master cylinder fluid pressure sensor PM.

During the execution of the vibration suppression control, the open pressure pv of the inlet valve VI is set to be larger than the open pressure pu of the pressure adjusting valve UP at the open pressure of the normally-open type electromagnetic valve (maximum pressure for maintaining the valve closed). When the brake operation member BP is not operated, the master cylinder chamber Rm and the reservoir RV are in a communicating state. In the event that the enclosed fluid pressure due to vibration suppression control becomes excessively large, first, the pressure adjusting valve UP is opened, and the excessively large fluid pressure is released toward the reservoir RV through the master cylinder chamber Rm. As a result, the influence of the enclosed fluid pressure on the brake fluid pressure Pw can be avoided.

At the end of the vibration suppression control, the inlet valve VI may be switched from the close position to the open position after the pressure adjusting valve UP is switched from the close position to the open position. First, the pressure adjusting valve UP is set to the open position, and the enclosed fluid pressure is released toward the reservoir RV, so that the influence of the enclosed fluid pressure on the brake fluid pressure Pw can be avoided.

OTHER EMBODIMENTS

Other embodiments will be described below. In other embodiments as well, effects similar to above (suppression of vibration of the check valve GQ etc.) are obtained.

In the embodiment described above, the linear type pressure adjusting electromagnetic valve UP whose valve-open amount is adjusted in accordance with the energization amount is adopted. For example, the pressure adjusting valve UP is an on/off valve (two-position switching type electromagnetic valve), but may be a valve in which the opening and closing of the valve is controlled by a duty ratio and the fluid pressure is linearly controlled.

In the embodiment described above, the configuration of the disc type braking device (disc brake) has been exemplified. In this case, the friction member is a brake pad and the rotating member is a brake disc. Instead of the disc type braking device, a drum type braking device (drum brake) can be adopted. In a case where a drum brake is adopted, a brake drum is adopted in place of the caliper. The friction member is a brake shoe, and the rotating member is a brake drum.

In the embodiment described above, a diagonal type fluid passage is exemplified as the two-system fluid passage. Instead, a front-rear type (also referred to as "H-type") configuration may be adopted. In the front-rear type fluid passage, the wheel cylinders CWi and CWj of the front wheels are fluidly connected to the first master cylinder fluid passage HM1 (i.e., the first system). Furthermore, the wheel cylinders CWk and CWl of the rear wheels are fluidly connected to the second master cylinder fluid passage HM2 (i.e., the second system).

The invention claimed is:

1. A brake control device for a vehicle that adjusts a fluid pressure of a brake fluid in a wheel cylinder provided on wheels of a vehicle, the brake control device comprising:
 a fluid passage that connects a master cylinder and the wheel cylinder of the vehicle;
 a first electromagnetic valve provided in the fluid passage;
 a second electromagnetic valve provided in the fluid passage between the first electromagnetic valve and the wheel cylinder;
 a fluid pump that is driven by an electric motor to suction the brake fluid from the fluid passage at a suction part between the first electromagnetic valve and the master cylinder and discharge the brake fluid to the fluid passage at a discharge part between the first electromagnetic valve and the second electromagnetic valve;
 a check valve provided between the fluid pump and the discharge part; and
 a controller that controls the first electromagnetic valve, the second electromagnetic valve, and the electric motor, wherein
 the controller is configured to execute a vibration suppression control for setting the first electromagnetic valve and the second electromagnetic valve at a close position immediately before the electric motor is stopped.

2. The brake control device for the vehicle according to claim 1, wherein
 the controller is configured to,
  determine whether a brake operation member of the vehicle is operated,
  permit execution of the vibration suppression control when the operation is unperformed, and
  prohibit execution of the vibration suppression control when the operation is performed.

* * * * *